March 14, 1967 G. MYATT 3,309,077
FEEDING, GRIPPING AND REGISTERING MECHANISM AND METHOD THEREFOR
Filed Oct. 1, 1964 7 Sheets-Sheet 1
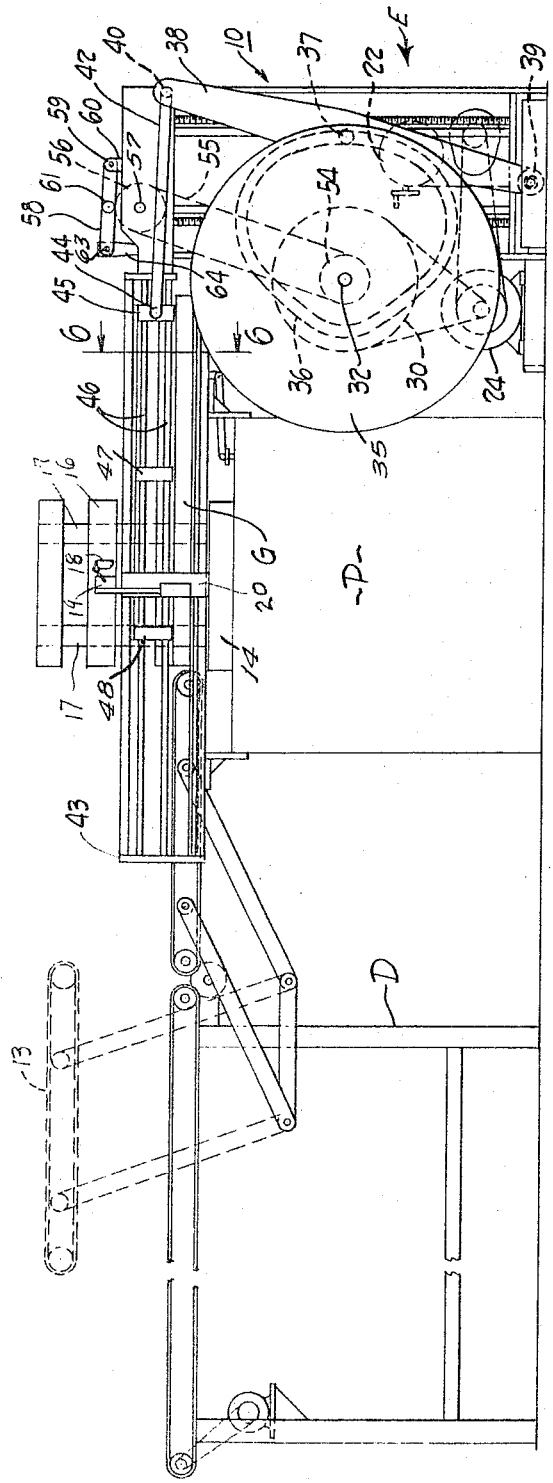
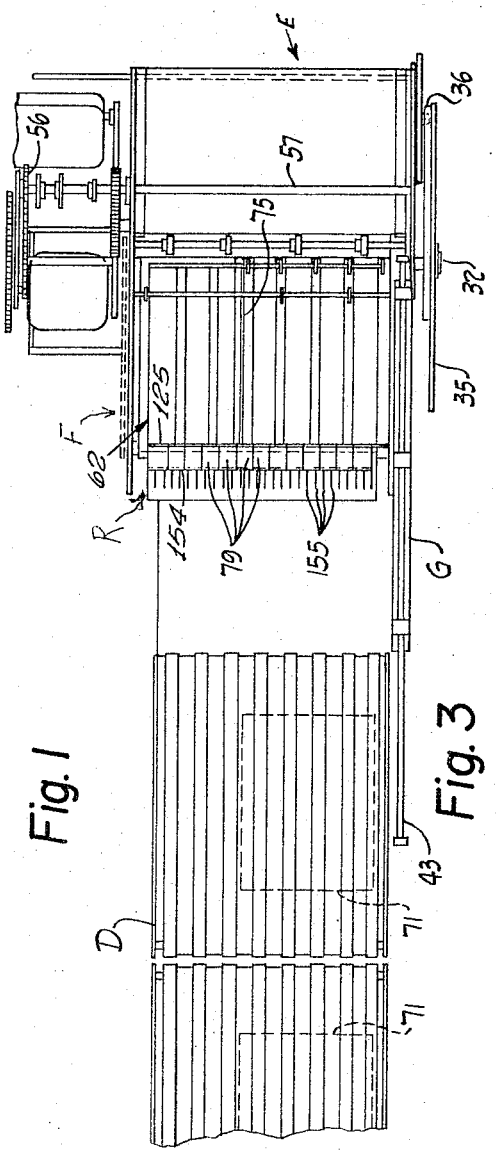
INVENTOR.
GERALD MYATT
BY Bosworth, Sessions,
Herrstrom and Knowles
ATTORNEYS.

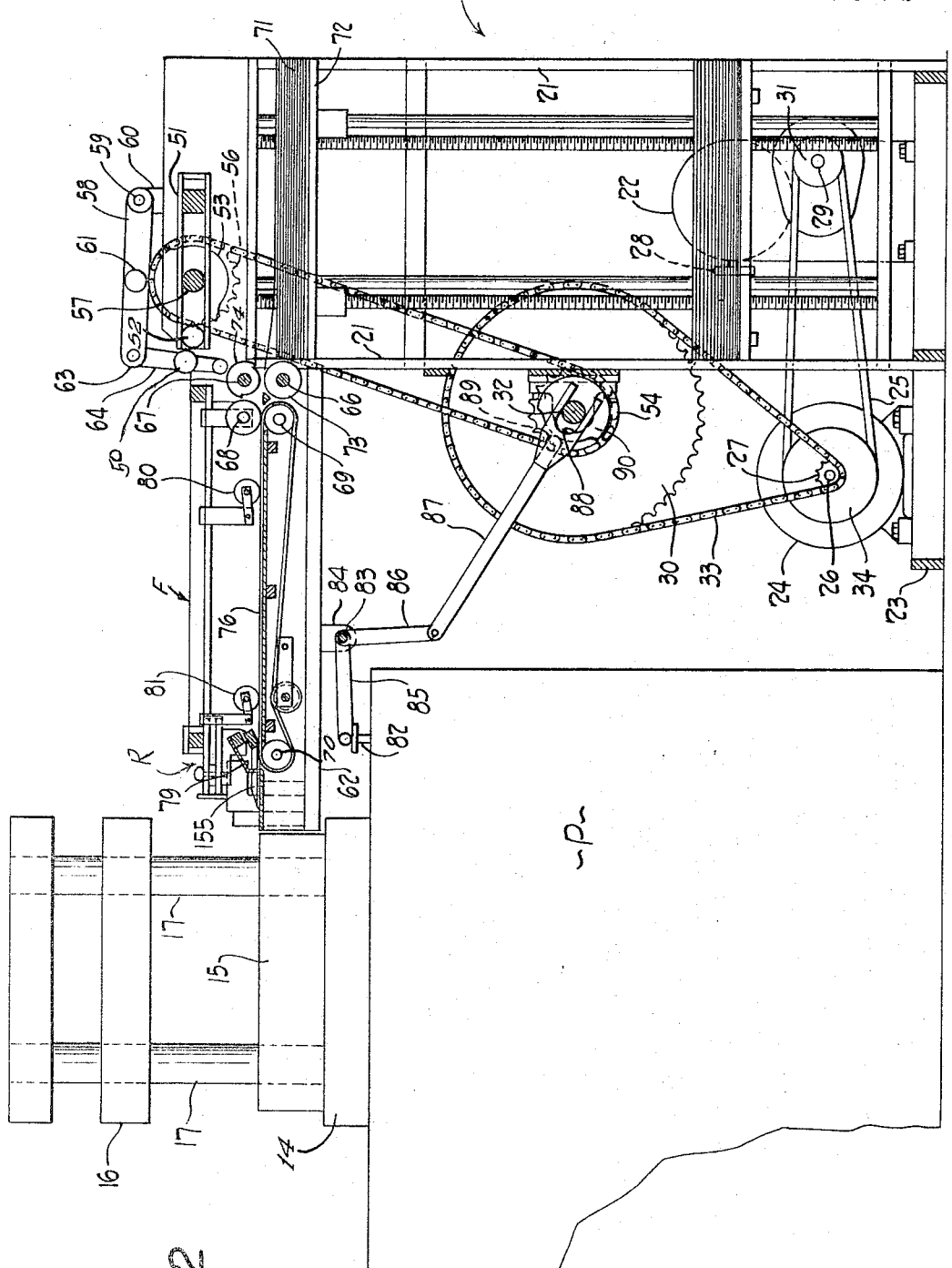

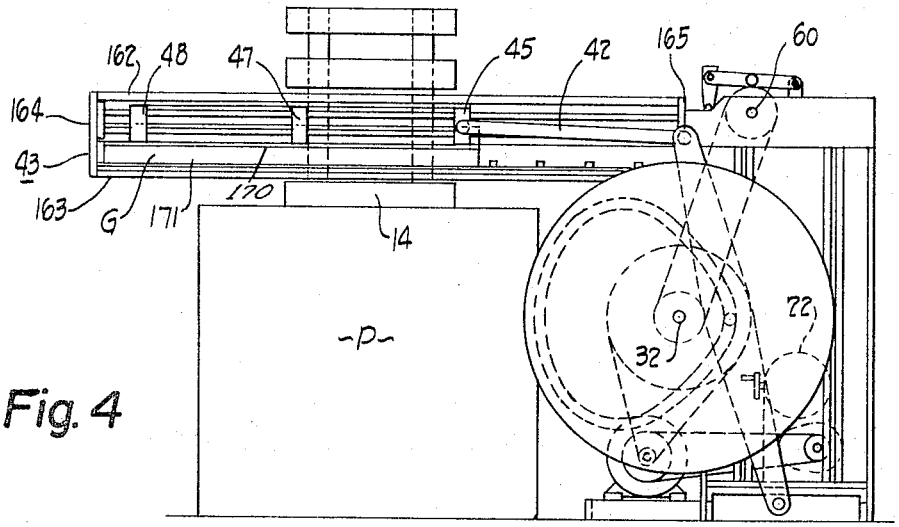
Fig. 4
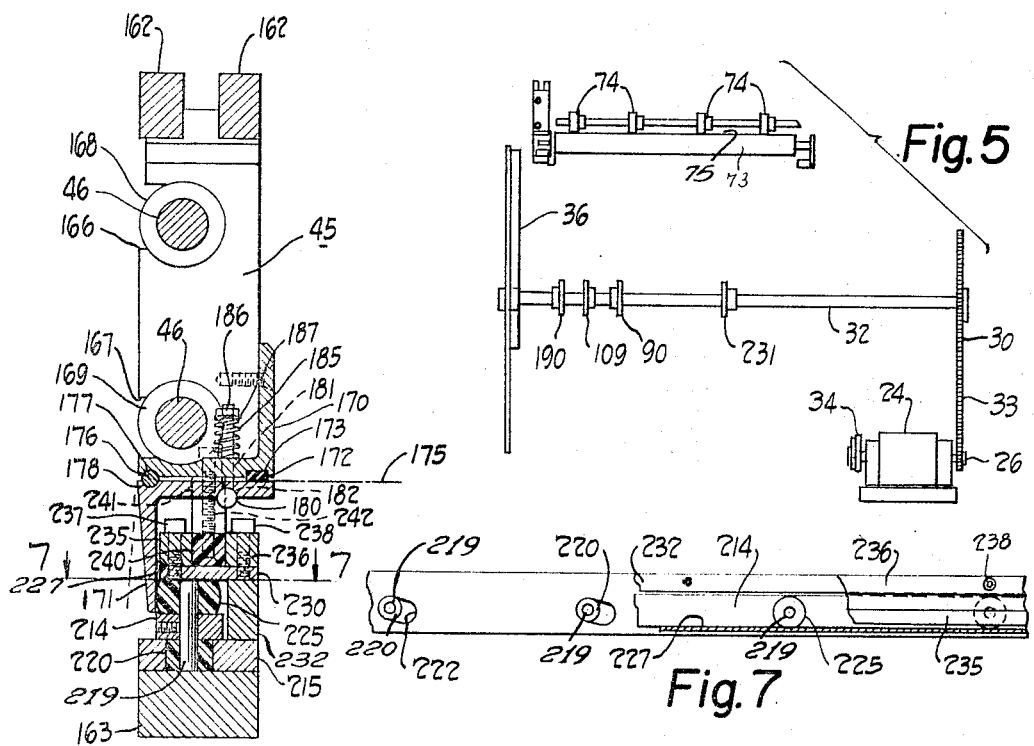
Fig. 5
Fig. 6
Fig. 7
INVENTOR.
GERALD MYATT
BY Bosworth, Sessions,
Herrstrom and Knowles
ATTORNEYS.

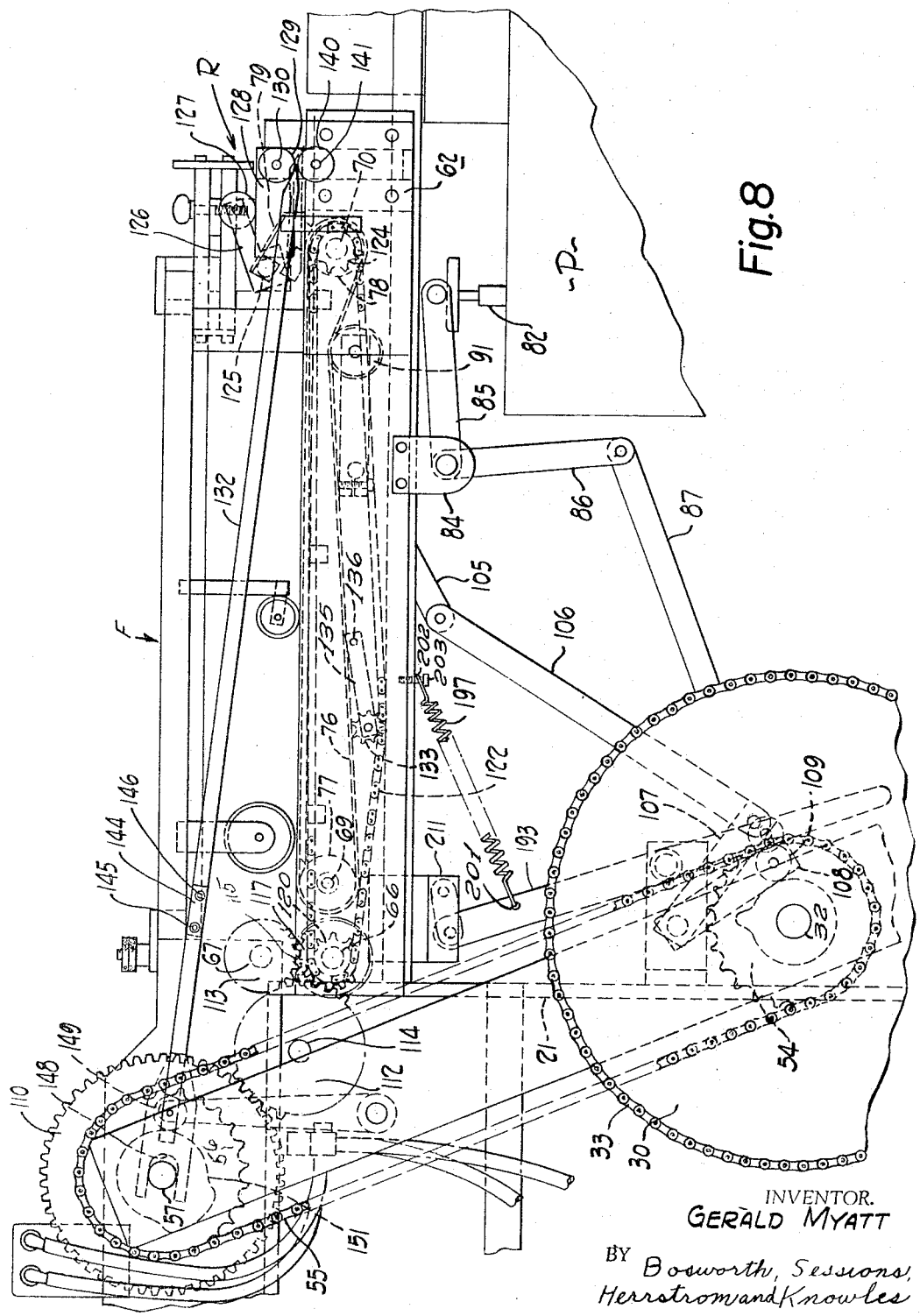

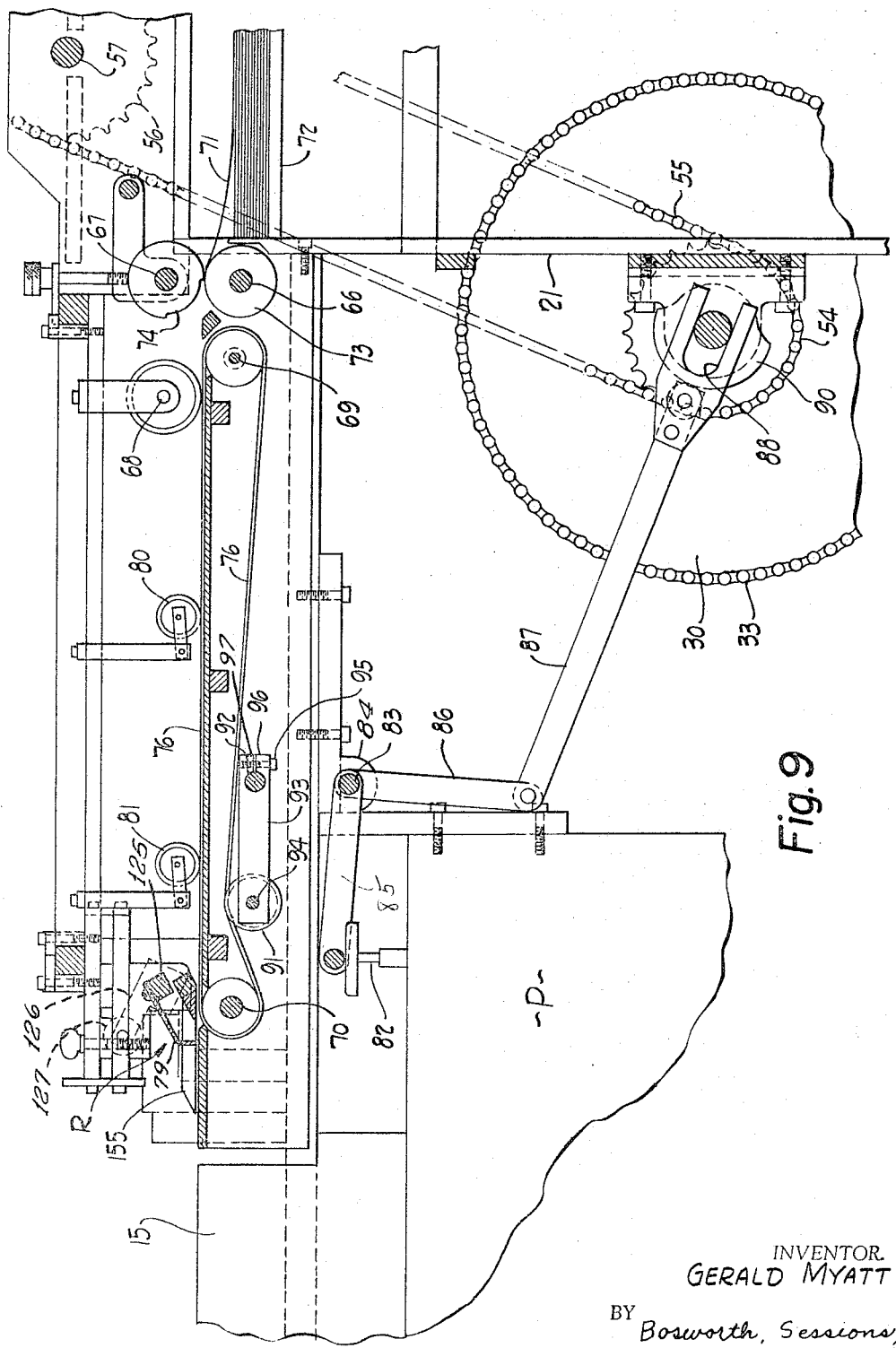

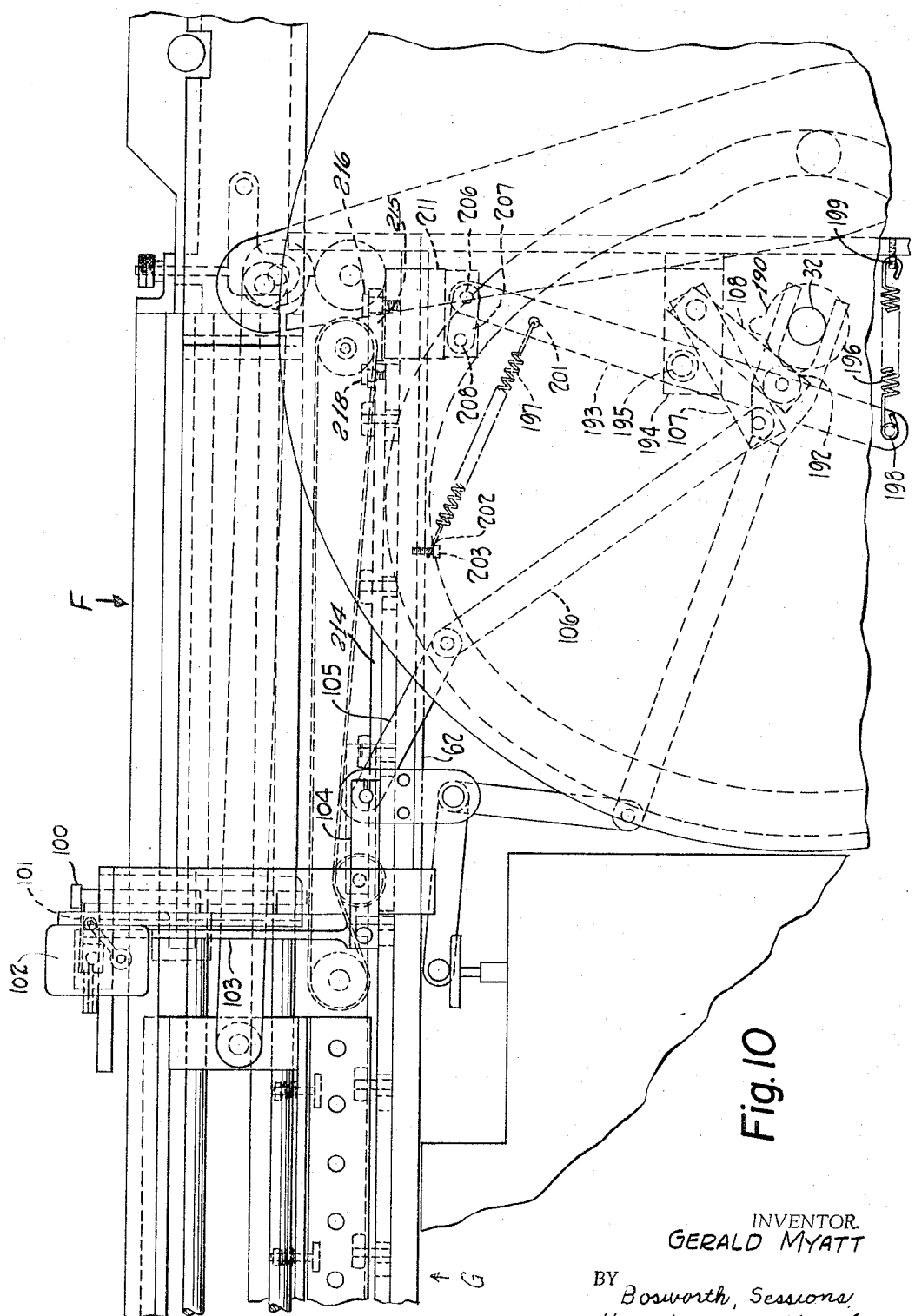

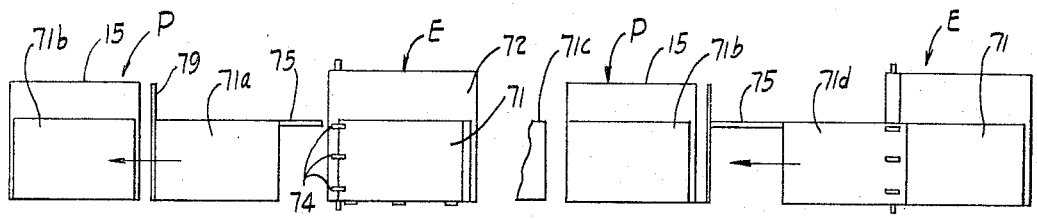
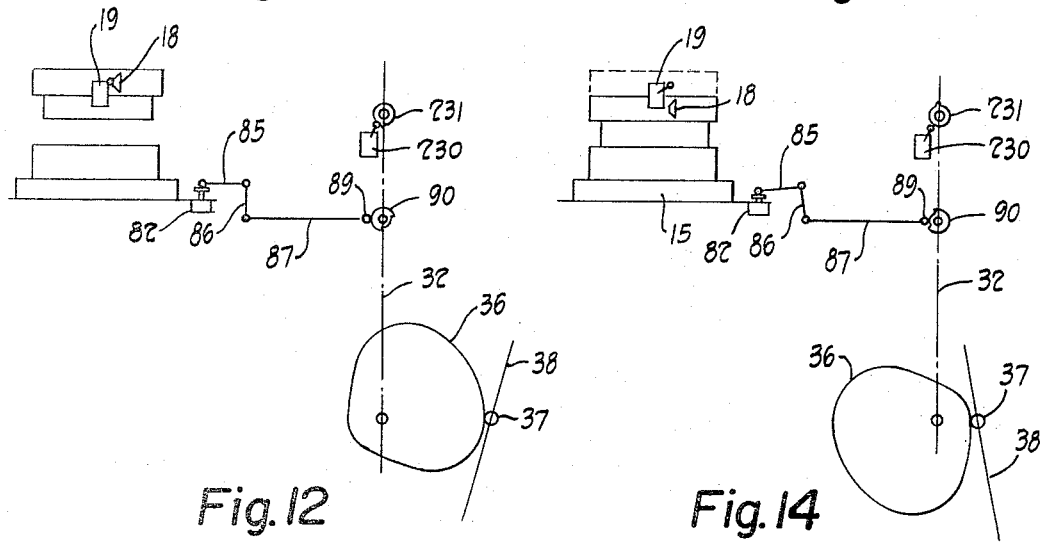

United States Patent Office 3,309,077
Patented Mar. 14, 1967

3,309,077
FEEDING, GRIPPING AND REGISTERING MECHANISM AND METHOD THEREFOR
Gerald Myatt, Parma Heights, Ohio, assignor to Pearce, Incorporated, Berea, Ohio, a corporation of Ohio
Filed Oct. 1, 1964, Ser. No. 400,658
8 Claims. (Cl. 271—3)

This invention relates to a sheet feed registering and delivering device and more particularly to a sheet feed registering and delivering device particularly adapted to cooperate with a printing press.

In feeding sheets, it is frequently important to control the registry and delivery to a very high degree of precision. For example, in feeding sheets to a color press it is important that the registry of the sheets be controlled within very close tolerances such that the colors of the pictures or printing be precisely located. Conventionally, the sheet feeding and registering devices for presses grip the forward or leading edges of the sheet. This, however, gives rise to numerous errors in alignment and registry. Usually the grippers are chain or belt driven and differences in tension of the belt or chain result in differences in registration of the sheets.

Accordingly, it is an object of this invention to provide an improved sheet feed registering and delivering device.

It is another object of this invention to provide a sheet feed registering and delivering device which registers the sheets with a high degree of precision.

It is a further object of this invention to provide a sheet registering and delivering device which grips the sheets being fed during the initial and terminal periods of the printing operation such that high precision is maintained between the positioning of the sheets.

Yet another object of this invention is to provide a sheet feed registering and delivering device with a gripper located along side the work path so that the gripper does not travel through the press work area.

A still further object of this invention is to provide a sheet feed registering and delivering device with a gripper which is monitored by the printing press cycle controlling mechanism such that the printing press is triggered by the gripper position.

Yet another further object of this invention is to provide sheet feed registering and delivering device with a control system in which the seet feeding and press operation are controlled by cams driven by a motor which drives the registering and delivering device so that the feeding and delivering device is closely synchronized with the press.

Yet another object of this invention is to provide a sheet feed registering and delivering device with a gripper which is slidably mounted beside the work path and therefore can be any desired length, which gripper provides for any desired number of work operations, each in perfect register such as a series of presses, die cutters, stamps, or laminators.

Still another object of this invention is to provide a sheet delivering device with a gripper which clamps the sheets while the sheets are in the press as well as sheets which are registered prior to feeding into the press such that one gripper stroke carries one sheet from the press and another sheet into the press.

Yet a further object of this invention is to provide a sheet feeding apparatus with a gripper which takes the work into the press and also takes the work out of the press.

Yet a further object of this invention is to provide a sheet feeding device for a press with a gripper with clamps the sheets before the sheets are released by the press and after the gripper has been retracted to a start position and which releases the sheets only after the sheets are engaged by the press.

These and various other objects and features of this invention will be more clearly understood from the reading of the detailed description of a preferred embodiment of this invention in conjunction with the drawing in which:

FIGURE 1 is a side view in elevation of a sheet feed registering and delivering device, a printing press and conveyor apparatus;

FIGURE 2 is a side view in elevation, to a larger scale partly in section and partly broken away, of the feeding and registering device and portions of the press and press control system of FIGURE 1;

FIGURE 3 is a plan view of the feeding and registering device and the conveyor apparatus of FIGURE 1, partly broken away;

FIGURE 4 is a view in elevation of the feeding and registering device of FIGURE 1 taken from the same side as FIGURE 1 and showing portions of the gripping and feeding mechanism in an advanced position as compared to FIGURE 1;

FIGURE 5 shows related portions of the drive mechanism in diagrammatic spacial relationship;

FIGURE 6 is a view in elevation, to an enlarged scale and in section, taken along the lines 6—6 of FIGURE 1 and looking in the direction of the arrows and showing portions of the gripping mechanism;

FIGURE 7 is a view, partly in section with portions broken away, taken along the lines 7—7 of FIGURE 6 and looking in the direction of arrows with the elements rotated clockwise 90°;

FIGURES 8 and 9 are views in elevation of the portions of the drive mechanism of the feeding and registering device taken from opposite sides of the device of FIGURE 1, and to an enlarged scale, FIGURE 9 being partly in section;

FIGURE 10 is a side view of the registering and delivering device of FIGURE 1 to an enlarged scale and a portion of the press, each shown partly broken away; and FIGURES 11 and 12 and FIGURES 13 and 14 are diagrammatic representations of the steps performed by the feeding apparatus in which the sheet feeding is shown in FIGURES 11 and 13 and the related timing apparatus is shown in a corresponding position in FIGURES 12 and 14.

Reference is now made to the drawing in which like reference numerals designate like parts throughout. FIGURE 1 is a view in elevation of one illustrative feeding, gripping and registering mechanism 10 in accordance with this invention which is coupled to an elevator, E and first feeds work in the form of sheets to a press, P and then feeds the discharge conveyor, D. Discharge conveyor apparatus, D has a parellelogram type of lever arrangement for lifting a section 13 of the discharge conveyor apparatus, D out of the plane containing the remainder of the conveyor apparatus as indicated by the dotted line portions. The feeding, gripping and registering mechanism 10 is mounted on, and cooperates with, elevator, E for elevating a group of sheets into position in which the sheets are to be fed into a suitable apparatus, such as the printing press, P, only the outline of which is shown in FIGURE 2. The printing press is illustrated diagrammatically only for the purpose of completing the explanation of the operation of this invention and includes a base 14, a bed 15, a platen 16, slidably mounted on vertical columns 17. The platen 16 has a switch cam 18 (FIG. 1) mounted on a vertical surface which cooperates with a micro-switch 19 mounted on a frame 20 and positioned in the path of the cam 18. The micro-switch 19 is connected in the platen drive system, not shown, for controlling the operation of the movement of the platen in a manner which will be subsequently described.

The elevator, E includes a generally rectangular frame 21 for the purpose of supporting the various elements of the mechanism. The apparatus 10 which feeds, grips, and registers the sheets further includes a drive motor 22, such as an electric motor, mounted on a suitable mounting platform 23. The drive motor 22 is coupled to an electric clutch brake 24 by means of a belt 25. Clutch brake 24 includes a drive shaft 26 on which is mounted a drive sprocket 27. The drive motor 22 is coupled to a variable speed drive unit, not shown in detail, the speed of which is controlled by means of a hand wheel 28 such that the drive motor 22 operates at a constant speed and the output shaft 29 on which a pulley 31 is mounted turns at a speed depended upon the setting of the hand wheel 28. The output pulley, or drive pulley 31, is connected to the clutch brake 24 by means of a belt 25 which engages a pulley 34 on the clutch brake 24. The drive sprocket 27 is coupled in driving relationship to a sprocket wheel 30 mounted on a suitable axle 32 by means of a chain 33. The axle 32 is rotatably journalled in the frame 21 and has a driven sprocket 30 secured to one end thereof and a cam wheel 35 secured to the opposite end thereof. The cam wheel 35 has a raised cam track 36 on the inside surface thereof which cam track guides a follower pin 37 mounted on a lever arm 38 the bottom end of which is rotatably mounted on a pin 39 in the base of the elevator E. On the opposite end of the lever 38 from the pin 39 is a pin 40 which connects the lever 38 to a link 42. The apparatus includes a gripping mechanism, G having a horizontal frame 43 having one end connected to the elevator, E and the other end positioned beyond the press, P. Frame 43 slidably supports a slide block 45 by means of a pair of slide rods 46. Link 42 is connected by a pin 44 to block 45 so that block 45 will be reciprocated along rods 46 by the rotation of cam wheel 35.

The gripping mechanism, G includes a pair of opposed jaws mounted beneath the sliding block 45 and a pair of blocks 47, 48 and these jaws are reciprocated in the horizontal frame 43 by means of arm 38 and its coupling to the slide block 45. The sheet feeding apparatus includes a driven sprocket 54 secured to the shaft 32 and connected by means of a chain 55 to a sheet feeding driven sprocket 56 secured to a shaft 57. An arm 58 is pivotably mounted by a pin 59 on a support arm 60 extending vertically from the frame 21 and the arm 58 carries pneumatic lifters, not shown, for elevating sheets and moving these sheets to the feed rollers. Arm 58 also carries a cam follower 61 which cooperates with cam wheel 53 (FIG. 2) mounted on the shaft 57. The arm 58 has a pin 63 on the opposite end from the pin 59 and the pin 63 supports a downwardly extending arm 64 which carries the nozzles of the pneumatic lifters. Arm 64 carries a pin 50 which is engaged by a sliding frame 51 carrying a cam follower pin 52 which engages cam 53.

A feeder F (FIGS. 2 and 8) having a generally rectangular, horizontally disposed frame 62 is mounted with one end of the top of the elevator E and extending to base 14 of the press P. The feeder F includes a number of shafts 66, 67, 68, 69 and 70 rotatably journalled in frame 62. Sheets 71 are fed from a stack on the platform 72 of the elevator E, and are initially lifted by the previously mentioned suitable suction devices, not shown, and placed on a feed roller 73 mounted on the shaft 66. When the roller 73 is driven through a gear mechanism, to be subsequently described, it feeds the sheet between the roller 73 and a plurality of segmented rollers 74 onto a group of belts 76 extending between the enlarged portions of shafts 69, 70. A side register, or guide 75 (FIGS. 5, 11 and 13) is provided on frame 62 to be engaged by the edges of the sheets 71 and thus align the sheets prior to the time they are gripped. A group of hold-down rollers 80, 81 are provided to hold the sheets in engagement with the belts 76.

The feeder F terminates adjacent the press P and in the region of this termination is provided with a registering apparatus R including a series of transversely aligned, downwardly extending fingers 79 (shown in section in FIGS. 2 and 9 and shown diagrammatically in FIG. 11) which fingers project in the path of the work sheets so that the sheet will be registered in a transverse position relative to the printing press bed 15. After a sheet is registered, it is gripped by the gripping mechanism G and fed to the press bed 15. The gripping mechanism G continues to hold the sheet on the bed 15 and releases the sheet only after the platen 16 secures the sheet on the bed 15.

The press operation is closely synchronized with the sheet feeding mechanism F and cannot operate until the sheet feeding mechanism F has fed a sheet to the press. A switch 82 (FIGS. 2, 9, 12 and 14) on the press P is operated by a link pivotably connected at pin 83 on a downwardly depending arm 84 beneath the feeder frame 62 and this link includes a switch engaging arm 85, intermediate link 86 and an arm 87 which terminates in a forked portion 88 slidably engaging the shaft 32 and is linked in timing relationship to the shaft 32 by means of a follower pin 89 (FIGS. 2, 12 and 14) which engages a cam 90 on the shaft 32. The feeding cycle including the actuation of the switch 82 will be subsequently described in detail. The sheet feeding is monitored by a paper sensor 100 (FIG. 10) which is mounted on an arm 101 of a micro-switch 102 mounted above the frame 62, as shown in FIGURE 10. The arm 101 is lifted each time a sheet is fed to the register R by a cam controlled linkage arrangement including push rod 103, a lever arm 104, a series of links 105, 106, 107 and 108, the last of which engages a cam 109 on shaft 32. When sensor 100 is lowered and no sheet is against the register R and under the sensor arm, switch 102 is operated and the feeding apparatus 10 stops because clutch brake 24 is released.

The conveyor system includes, as shown in FIGS. 8 and 9, an idler roller 91 mounted on the frame 62 by means of a pin 92, an arm 93, and a shaft 94 supporting the roller 91 and this arrangement includes a locking nut 95 for engaging the bifurcated ends 96, 97 of the arm 93 to lock the arm in position such that it takes the slack out of the conveyor belts 76.

The timing of the feeding device with regard to the operations of sheet feeding and registering is controlled by cams mounted on, and secured to, the shaft 32. The shaft 57 is rotatably driven from the shaft 32 by means of the chain 55 and the sprocket 56 previously described. A circular gear 110 (FIG. 8) is secured to the shaft 57 and is coupled to an idler gear 112 in driving relationship and is coupled to a gear 113 secured to shaft 67 through a gear 115 on shaft 66 to drive segmented rollers 74 (FIG. 9). Gear 112 is secured to shaft 114 which is rotatably journalled in the frame 21 and is coupled to a gear 117 secured to shaft 66 for driving the lower feed rollers including roller 73. The shaft 66 carries a chain sprocket 120 which supports an endless chain 122 for driving the conveyor belts 76 and a second sprocket 124 is secured to shaft 70 and is driven by the chain 122.

The registering apparatus R includes the previously mentioned plurality of registering fingers 79 as best seen in FIGURE 3 and these registering fingers 79 are each connected to a shaft 125 rotatably mounted in the horizontal frame 62. Shaft 125 is coupled by means of an arm 126 (FIG. 9) and a roller 127 to block 128 (FIG. 8) slidably mounted in frame 62. Block 128 has a roller 129 rotatably mounted on a pin 130 and positioned in the path of a wedge 132. An idler sprocket 133 is rotatably supported on the frame 62 by means of an arm 135 the opposite end of which is secured by means of a bolt 136 to a section of the frame 62. The idler sprocket 133 maintains tension in the chain 122.

The gripping mechanism includes the generally rectangular frame 43 which extends from the elevator E rests upon the base 14 of the press P and extends to conveyor D. The mechanism also includes an upper and a lower rod portion, or frame members 162, 163, a pair of vertical members 164, 165 and the previously mentioned pair of intermediate horizontal rods 46 which support the sliding blocks 45, 47, 48. The shafts 69, 70 are rotatably journalled in frame 62 and support the belt driving rollers 77, 78, respectively.

The end of the finger lifting wedge 132 which engages roller 129, rests upon roller 140 rotatably mounted on a pin 141 which is connected to the frame 62. Thus, the wedge 132 may slide upon the roller 140 and, in so doing, elevates the roller 129, the block 128, the roller 127 and thus will pivot the arm 126 counterclockwise as viewed in FIGURE 8. The wedge 132 is slidably mounted in a sleeve 144 which is mounted on the frame 62 by means of a pair of bolts 145, 146. The opposite end of the wedge 132 from the wheel 140 has an enlarged section with an oval-shaped notch 148 therein which slidably engages the shaft 57. The wedge 132 carries a cam follower wheel 149 which follows a register finger timing cam 151. The rotation of the timing cam 151 by shaft 57 causes the follower 149 to move to the right as viewed in FIGURE 8 and forces the wedge 132 between the wheels 129, 140 elevating block 128 and rotating arm 126 to thus elevate the register fingers 79. The feeder F includes a hold-down rake supported on a rod 154 which extends transversely of the frame 62 over the shaft 70 and a plurality of fingers or tines 155 extend from support 154 in a direction of the feeding of the sheets.

FIGURES 6 and 7 are sectional views in elevation, and in plan, partly broken away, respectively, of portions of the gripping and feeding mechanism G. Each of the sliding blocks 45, 47 and 48 has a pair of sleeves 168, 169 slidably engaging the horizontal slide rods 46. These sleeves rest in suitable notches in each block such as notches 166, 167, respectively, of the block 45. As shown in FIGURE 6, a right-angled upper gripping jaw 170 is slidably mounted on rods 46 by blocks 45, 47 and 48 between upper horizontal frame members 162 and lower horizontal frame member 163. Jaw 170 is mounted with one surface parallel to the bottom surface of the slide block 45 and with another surface mounted vertically on the inner vertical surface of the block 45. The upper jaw 170 pivotally supports a lower gripping jaw 171. Gripping jaw 170 connects the slide blocks 45, 47 and 48 and thus extends a sufficient distance along the frame 160 of the gripper G to engage two spaced apart sheets 71 and simultaneously grip and feed these two sheets. Jaw 170 has an elongated resilient strip 172 mounted in a suitable channel like recess 173 for the purpose of engaging the top surfaces of the sheets as they are gripped and fed along a sheet line 175. The lower gripping jaw 171 is pivotally mounted on the upper gripper member 170 by means of an elongated hinge pin 176 which rests in a pair of crescent-shaped recesses 177, 178 in the members 170, 171, respectively, and the lower gripping jaw 171 pivots relative to this hinge member. The lower gripping member 171 is urged into its position shown in full lines in FIGURE 6 by means of a plurality of rod and spring mechanisms, only one of which is shown. This mechanism includes an L shaped, or hooked shaped, rod 180 which extends through an aperture 181 in the horizontal surface of the member 170 and extends through an aperture 182 in a horizontal surface of the lower gripping jaw 171 and has a helical spring 185 encircling the shank of the rod. Spring 185 is held on the rod 180 by means of a nut 186 and a washer 187. Because the nuts threadably engage the hooked shaped bolts 180, it is possible to adjust the gripping tension of the gripper mechanism by rotating the nuts 186. These jaw tensioning and closing members for the gripper jaws are spaced along the gripper jaw 170 between the sliding blocks 45, 47, and 48. From the foregoing explanation it is apparent that the closing means for the gripping members 170, 171 is the J shaped hooks 180 and their associated springs 185, retained in position by the nut and washer assemblies 186, 187.

The gripper opening mechanism is actuated from the rotation of the shaft 32 by means of a cam 190 shown in FIGURES 8 and 10, and cam 190 cooperates with a cam follower 192 mounted on a gripper opening lever 193 which is pivotally mounted on a plate 194 depending from the frame 21 by means of a pin 195. The gripper opening lever 193 is spring biased on opposite sides of the pivot pin 195 by means of a pair of springs 196, 197. The spring 196 connects a pin 198 on the lower end of the lever 193 and a pin 199 on the frame 21. The spring 197 has a hooked shaped end which hooks into an aperture 201 in the lever 193 and a second hooked shaped portion 202 which engages a bolt 203 which is threaded into the bottom of frame 62. The upper end of lever 193 is connected by means of a pin 206, a link 207, and a pin 208 to a sliding block 211. The sliding block 211 slidably engages the horizontal member 163 of the frame 160. The sliding block 211 is coupled to an elongated sliding plate 214 (FIGS. 6, 7 and 10) by means of a link 215 (FIG. 10) which is secured by means of a bolt 216 to the sliding block 211 and by means of a second bolt 218 to the sliding plate 214. The sliding plate 214 rests on the elongated member 215 shown in FIGURES 6 and 7 and has a plurality of pins 219 projecting perpendicularly therefrom with a plurality of rollers 220 on the bottom ends thereof resting in suitable oval cam slots 222 and the upper ends of the pins support a plurality of nylon rollers 225, which rollers engage the inner downwardly projecting surface 227 of the lower gripping jaw, or member, 171. When the sliding block 211 is moved toward the elevator, E or to the left as viewed in FIGURE 12, then the sliding plate 214 will be moved to the right, as viewed in FIGURE 7, such that the rollers 220 will be cammed downwardly, as viewed in FIGURE 7, or the left as viewed in FIGURE 6, applying a force to the downwardly projecting inner surface 227 of the lower gripping member 171 such that the lower gripping member will be pivoted to its dotted line position as indicated in FIGURE 6 and the sheets will be released by the gripping member.

In FIGURE 6, the nylon rollers 225 are retained on the ends of pins 218 by means of substantially flat plate 230 secured to a rectangular elongated bar 232 which extends the length of the frame 43 and is secured thereto by suitable means, not shown. Above the plate 230, and mounted thereon, are a pair of elongated bars 235, 236 which are secured in parallel relationship along the opposite edges of the plate 230 by suitable bolts such as the bolts 237, 238. Between these parallel members, an elongated nylon slide 240 is positioned. Slide 240 projects through spaced apertures 241 in lower jaw 171 and is secured at correspondingly spaced areas to the upper gripper jaw 170 by means of bolts 242. The nylon slide 240 and its connection through bolt 242 to the upper gripper jaw 170, prevent the torque applied to the lower gripper jaw 171 and transmitted through the springs 185 and the hooks 180 from misaligning the upper jaw 170.

THE OPERATION OF THE DEVICE

The operation of the device will now be described in conjunction with FIGURES 11, 12, 13 and 14 in which FIGURE 11 is a diagrammatic plan view, to a reduced scale, of the sheets being fed from the elevator E to the press P. The timing mechanism and press illustrated diagrammatically in FIGURE 12, is shown in a position corresponding to that which produces a positional relationship with the sheets shown in FIGURE 11. Similarly, the positional relationship of the sheets shown diagrammatically in FIGURE 13 correspond to the relationship which exists when the timing mechanism and press is in the position indicated diagrammatically in FIGURE 14. In FIGURE 11, a stack of sheets 71 are placed upon the platform 72 of the elevator E to be fed through the feed rolls 74. The next sheet to the left, as viewed in FIGURE 11, is a sheet 71a which has passed along alignment guide 75 and has reached the registering fingers 79 of the registering apparatus R. The next sheet to the left as viewed in FIGURE 11 is designated 71b and this sheet has been precisely positioned on the bed 15 of the press P by the gripping and feeding mechanism G. The gripper mechanism G, by means of gripper jaws 170, 171, now grips both the sheets 71a and 71b. As shown in FIGURE 12, the platen 16 of the press P is in its terminal position in which the platen mounted switch cam 18 engages microswitch 19. When the platen is in the elevated position, shown in FIGURE 12, the switch cam 18 engages the micro-switch 19 to close the circuit of micro-switch 19 and complete the circuit through the press operating mechanism which includes a micro-switch 230 engaging a cycle cam 231 mounted on the axle 32. The axle 32 is illustrated by a broken line to show the mounting of the cycle cam 231, the press trip cam 90 and the gripper movement cam 36. The movement of the gripper moving lever 38 with its cam follower 37 is diagrammatically illustrated and shows in FIGURE 12, the lever in its retracted position such that the gripper will be at its first terminal position for engaging sheets to begin feeding work into the press as shown in detail in FIGURES 1 and 10. The position indicated diagrammatically in FIGURE 14, shows the lever 38 in its advanced or second terminal position in which the gripping mechanism, G is simultaneously depositing work on the bed 15 of the press, P and discharging the sheets picked up from the press bed 15 onto the discharge conveyor D (FIGURES 1 and 3) as shown in detail in FIGURE 4.

The sequence of operations is as follows. At the start of the cycle, the micro-switch 19 on the press P is energized upon arrival of the cam 18 on the platen 16 as the platen reaches its opened position, as shown in FIGURE 12. This position is also shown in FIGURE 1. The feed device F is started in motion by the clutch brake unit 24 which turns main shaft 32 carrying cam 36 that activates arm 38 connected by link 42 to the gripper assembly G slidably mounted on horizontal rods 46. The lower gripper jaw 171 is normally closed by springs 185 and hooks 180 and is opened by the torque produced by the cooperation of the gripper controlling lever cam 190, its cooperating follower 192, the lever 193, the slide block 211, the sliding plate 214 and the camming operation of the pins 218, the rollers 220 and 225 which force the lower jaw 171 into its dotted line position indicated in FIGURE 6. This open jaw position is maintained during the retraction of the gripper jaws 170, 171, such that the jaws engage opposite surfaces of the edge of a sheet 71 parallel to the feed path. The gripper jaw 171 closes through operation of cam 190 after it is retracted and simultaneously grips the work sheet 71b in the press P and sheet 71a at the register position in engagement with register fingers 79. Gripper G moves forward to advance the sheets to a position shown in FIGURE 4, depositing work that was previously 71b in the press P as 71c on the discharge conveyor D. Simultaneously, the gripper positions pre-registered work that was 71a onto the press bed 15 as work 17b. Work sheets 71 and specifically, the top sheet 71 that was held on the stack of the elevator E by the segment feed rolls 74, is picked by the pneumatic apparatus, not shown, and moves forward toward register gate R on moving belts 76. The press trip cam 90 trips micro-switch 82 allowing the press P to close to a position shown in FIGURE 14. The work 71 continues to move from the elevator E toward register gate R and the gripper jaw 171 is opened by the operation of the gripper lever control cam 190. The gripper G is retracted or moved to its initial, or starting, terminal position by the cam 36 to a position shown in FIGURE 12, i.e., diagrammatically represented with respect to the cam 36 and the cam follower 37. The work 71a registers against register gate R and specifically against the registration fingers 79 and against the side register guide 75. The cycle cam 231 stops the feeding device by opening the micro-limit switch 230 which deenergizes the clutch brake unit 24 with the feed mechanism in the position shown in FIGURE 1. The cycle of operations outlined above will be repeated until the apparatus, or the sheets 71, are exhausted from the elevator E.

While I have shown and described a preferred embodiment of this invention, it is understood that the concepts and features thereof may be incorporated in other embodiments without departing from the spirit and scope of this invention.

What is claimed is:

1. In a sheet feeding apparatus, the combination comprising:
   frame means;
   conveyor means on said frame means;
   a press including a bed and a platen adjacent to one end of said conveyor means; and
   gripping means slidably mounted in said frame means for gripping at least one edge of a sheet to be fed including means gripping an edge which is parallel to the direction of feed, said gripping means feeding said sheet between said bed and said platen and including means for releasing said sheet only after said bed and said platen engage said sheet, said gripping means further including means for subsequently gripping said sheet before said bed and said platen release said sheet.

2. In a sheet feeding apparatus, the combination comprising:
   frame means;
   conveyor means on said frame means;
   a press adjacent one end of said frame means; and
   gripping means slidably mounted in said frame means including a first horizontal bar slidably mounted on said frame means for engaging the top surface of a sheet along an edge parallel to the direction of feed, a second horizontal bar hinged to said first bar for engaging the bottom surface of said sheet along said edge and means for swinging said second bar relative to said first bar to grip said sheet, and means for swinging said second bar relative to said first bar to release said sheet only after said press engages said last-mentioned sheet.

3. In a sheet feeding apparatus, the combination comprising:
   frame means;
   conveyor means on said frame means;
   a work performing apparatus adjacent one end of said frame means for performing a work operation on sheets fed thereto from said conveyor means; and
   gripping means slidably mounted in said frame means for gripping one edge of a sheet to be fed including a first horizontal bar slidably mounted on said frame for engaging the top surface of said sheet along an edge parallel to the direction of feed, a second horizontal bar hinged to said first bar for engaging the bottom surface of said sheet along said edge, means for swinging one of said bars relative to the other bar to grip said sheet and releasing means for swinging said one bar relative to said other bar to release said sheet.

4. In a sheet feeding apparatus, the combination comprising:
   frame means including rod means extending parallel to the feeding path;
   gripping means including a first gripper jaw slidably mounted between two terminal positions on said rod means for engaging the top surface of the sheets along an edge parallel to the direction of feed, a second gripper jaw pivotably mounted relative to said first gripper jaw for engaging the bottom surface of said sheet along said edge, spring means normally biasing said second bar into a position of sheet engagement; and releasing means for pivoting said second gripper jaw relative to said first gripper jaw to release said sheets.

5. The combination according to claim 4 wherein said releasing means includes:

means for pivoting said second gripper jaw away from said first gripper jaw when said first gripper jaw means is at one of said terminal positions.

6. The combination according to claim 5 wherein said means for pivoting said second gripper jaw includes:

a slide bar slidably mounted on said frame means;
cam means coupling said slide bar to said frame means; and
roller means on said slide bar for pivoting said second gripper jaw in response to the cooperation of said cam means and said slide bar.

7. In a sheet feeding apparatus, the combination comprising:

a drive mechanism including a main drive shaft having timing cam means thereon;

frame means including rod means extending parallel to the feeding path and means rotatably supporting said drive shaft;

gripping means including a first gripper jaw slidably mounted between two terminal positions on said rod means for engaging the top surface of the sheets along an edge parallel to the direction of feed, a second gripper jaw pivotably mounted relative to said first gripper jaw for engaging the bottom surface of said sheet along said edge, spring means normally biasing said second bar into a position of sheet engagement;

releasing means including said timing cam means for pivoting said second gripper jaw relative to said first gripper jaw to release said sheets at each of said terminal positions.

8. In a precision sheet feeding apparatus, the combination comprising:

frame means;
a conveyor means on said frame means;
a press including a bed and a platen adjacent one end of said frame means;
gripping means reciprocally mounted on said frame means for reciprocal movements along a fixed straight line for gripping at least one edge of a first sheet and a second sheet spaced from said first sheet along a workpath, including means gripping an edge of each sheet which is parallel to the direction of feed, means including said gripping means for feeding said sheets seriatim between said bed and said platen and releasing said sheets only after said bed and said platen engage one of said sheets, said gripping means including means for regripping only one of said sheets and for gripping a third sheet spaced along said workpath from said one sheet before said platen disengages said one sheet.

References Cited by the Examiner

UNITED STATES PATENTS

| 993,613 | 5/1911 | Morrison | 101—287 |
| 2,147,529 | 2/1939 | Gifford | 271—54 |
| 2,681,104 | 6/1954 | Barney et al. | 83—390 X |
| 3,081,655 | 3/1963 | Hiroumi et al. | 83—277 X |

FOREIGN PATENTS

| 443,464 | 2/1936 | Great Britain. |
| 903,104 | 8/1962 | Great Britain. |

M. HENSON WOOD, JR., *Primary Examiner.*

ALLEN N. KNOWLES, *Examiner.*